(12) United States Patent
Fryz et al.

(10) Patent No.: US 9,098,551 B1
(45) Date of Patent: Aug. 4, 2015

(54) METHOD AND SYSTEM FOR RANKING CONTENT BY CLICK COUNT AND OTHER WEB POPULARITY SIGNALS

(71) Applicant: GOOGLE INC., Mountain View, CA (US)

(72) Inventors: Lukasz Fryz, Krakow (PL); Grzegorz Glowaty, Przemysl (PL); Gregory Allan Funk, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 85 days.

(21) Appl. No.: 13/662,235

(22) Filed: Oct. 26, 2012

Related U.S. Application Data

(60) Provisional application No. 61/553,046, filed on Oct. 28, 2011.

(51) Int. Cl.
*G06F 7/00* (2006.01)
*G06F 17/30* (2006.01)

(52) U.S. Cl.
CPC .................................. *G06F 17/3053* (2013.01)

(58) Field of Classification Search
CPC .................................................... G06F 17/3053
USPC ......................................................... 707/748
See application file for complete search history.

(56) References Cited

U.S. PATENT DOCUMENTS

2006/0253578 A1* 11/2006 Dixon et al. ................... 709/225
2010/0114862 A1* 5/2010 Young et al. .................. 707/709

* cited by examiner

*Primary Examiner* — Ajith Jacob
(74) *Attorney, Agent, or Firm* — Morgan, Lewis & Bockius LLP

(57) ABSTRACT

A computer-implemented method for ranking content entities by their associated web pages and search queries is disclosed. The method comprises: at a computer system having memory and one or more processors: performing a textual analysis on one or more predefined websites to identify a plurality of reference web pages, further including determining content information and one or more search queries for each reference web page; for a respective content entity: identifying a subset of the reference web pages and the corresponding search queries based on the content information of the reference web pages and query terms of the corresponding search queries; and determining a popularity ranking for the respective content entity based on user interactions with the identified subset of reference web pages and the corresponding search queries; and selecting at least a subset of the content entities for display to an end user in accordance with their respective popularity rankings.

27 Claims, 6 Drawing Sheets

METHOD AND SYSTEM FOR RANKING CONTENT BY CLICK COUNT AND OTHER WEB POPULARITY SIGNALS

RELATED APPLICATIONS

This application claims the benefit of U.S. provisional Patent Application 61/553,046, "Method and System for Ranking Content by Click Count and Other Web Popularity Signals", filed on Oct. 28, 2011, which is hereby incorporated by reference in its entirety.

TECHNICAL FIELD

The disclosed implementations relate generally to content ranking, and in particular, to system and method for ranking content by click count and other web popularity signals.

BACKGROUND

Popularity of a piece of content, e.g., a TV program, in the general population is very useful to a TV content recommendation system when making recommendations to its users, especially those users for which the system has little knowledge. But the process of acquiring first-hand, comprehensive popularity data about the TV programs is often expensive and time-consuming. For example, the universe of content from which to make recommendations is so large that it renders almost any manual approaches intractable. Moreover, it is even more difficult for the system to make accurate recommendations when the system in general and individual devices in particular have initially started operation and have very little, if any, logged data related to TV programs that have been watched in the past. Finally, a successful recommendation system should be able to update the recommended TV programs continuously as their popularity changes over time.

SUMMARY

In accordance with some implementations described below, a computer-implemented method for ranking content entities by their associated web pages and search queries comprises: at a computer system having memory and one or more processors: performing a textual analysis on one or more predefined websites to identify a plurality of reference web pages, further including determining content information and one or more search queries for each reference web page; for a respective content entity: identifying a subset of the reference web pages and the corresponding search queries based on the content information of the reference web pages and query terms of the corresponding search queries; and determining a popularity ranking for the respective content entity based on user interactions with the identified subset of reference web pages and the corresponding search queries; and selecting at least a subset of the content entities for display to an end user in accordance with their respective popularity rankings.

In accordance with some implementations described below, a computer system comprises one or more processing units; and memory storing one or more programs to be executed by the one or more processing units. The one or more programs comprising instructions for: performing a textual analysis on one or more predefined websites to identify a plurality of reference web pages, further including determining content information and one or more search queries for each reference web page; for a respective content entity: identifying a subset of the reference web pages and the corresponding search queries based on the content information of the reference web pages and query terms of the corresponding search queries; and determining a popularity ranking for the respective content entity based on user interactions with the identified subset of reference web pages and the corresponding search queries; and selecting at least a subset of the content entities for display to an end user in accordance with their respective popularity rankings.

In accordance with some implementations described below, a non-transitory computer readable-storage medium stores one or more programs for execution by one or more processors of a computer system for ranking content entities by their associated web pages and search queries, the one or more programs comprising instructions for: performing a textual analysis on one or more predefined websites to identify a plurality of reference web pages, further including determining content information and one or more search queries for each reference web page; for a respective content entity: identifying a subset of the reference web pages and the corresponding search queries based on the content information of the reference web pages and query terms of the corresponding search queries; and determining a popularity ranking for the respective content entity based on user interactions with the identified subset of reference web pages and the corresponding search queries; and selecting at least a subset of the content entities for display to an end user in accordance with their respective popularity rankings.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Reference will now be made in detail to implementations, examples of which are illustrated in the accompanying drawings. While particular implementations are described, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

It is a challenge for a TV content recommendation system to acquire first-hand information about the popularity of a show, a movie, or other programs (collectively referred to as "content entities") when the system has little knowledge about the viewers' past browse, search, watch, and related activities. In some implementations, this challenge is addressed by leveraging other sources of information about media content items to estimate the relative popularity of various movies and TV programs. For example, if a web page provides a description of a TV program, including its title, year of release, cast, and synopsis, etc., the popularity of the web page (e.g., the number of unique user visits during a predefined time period) can be used in some implementations as a reliable surrogate or proxy for the popularity of the respective TV program. Such information can be obtained in some implementations by processing the log data of a search engine or a web server that hosts the web page. After determining the popularities of a large number of content entities (e.g., movies, TV shows, web pages, apps, or other media content items) based on other information sources, the system can identify a subset of content entities, including a TV series, a TV show, a movie, etc., to be presented to an end user through a browser interface for a given query/time/user/location.

Figure 1:
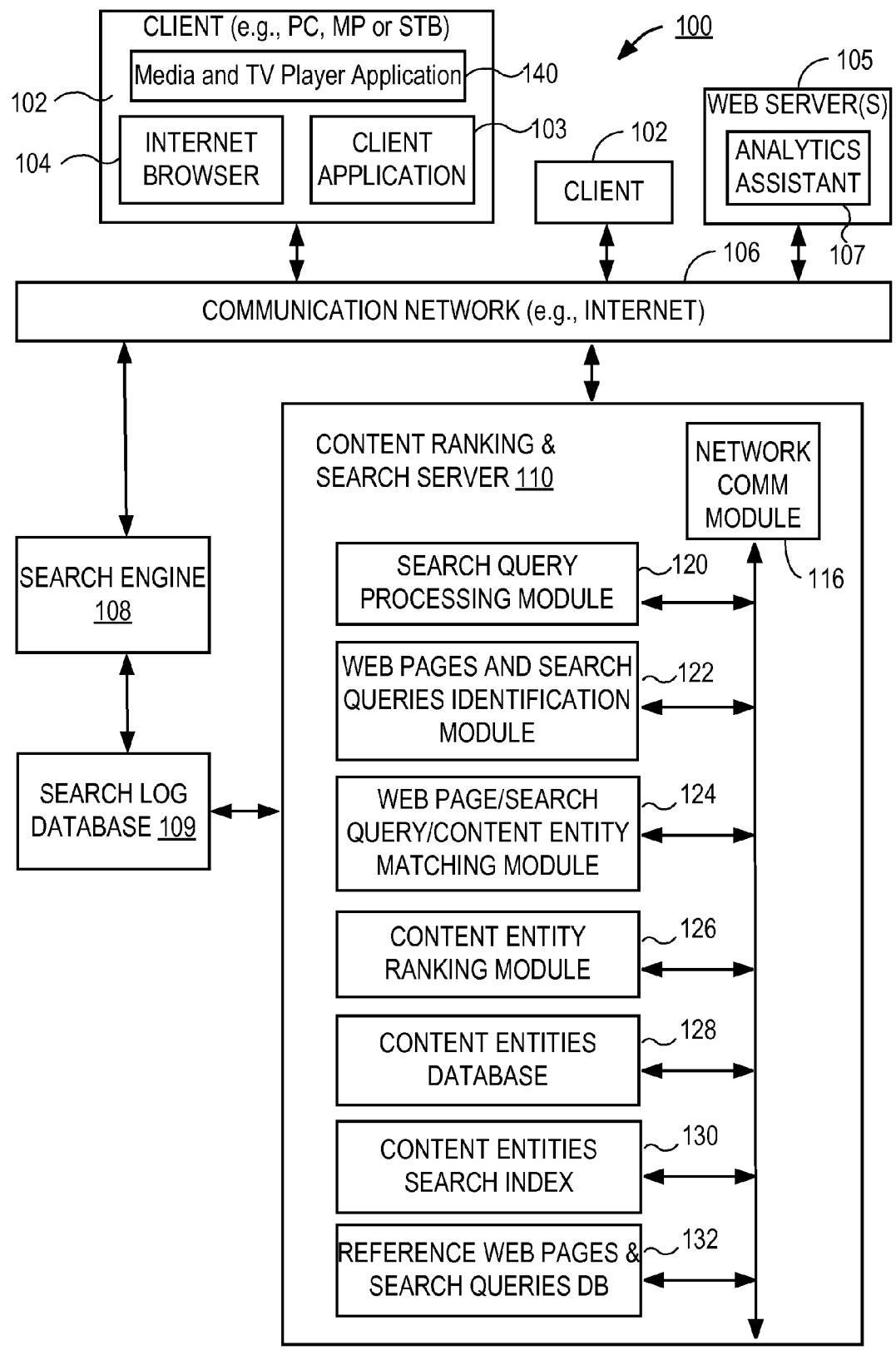
FIG. 1 is a block diagram illustrating a network environment in which a content ranking and search server determines content popularities and recommends content to an end user in accordance with some implementations.

FIG. 1 illustrates a distributed system 100, suitable for practice of some implementations of the invention. The system 100 may include one or more client systems or devices 102 and web servers 105 that are located remotely from a search engine 108 and a content ranking and search server 110. A respective client system 102, sometimes called a client or client device, may be a desktop computer, laptop computer, kiosk, mobile phone, personal digital assistant, set top box, tablet computer, or the like. A web server 105 hosts a plurality of web pages, each web page providing a description of a particular content entity. A communication network 106 connects the client systems or devices 102 and the web servers 105 to the search engine 108 and the content ranking and search server 110.

When an end user starts a client application 103 (e.g., a TV content browsing and search interface) at a client system 102, the content ranking and search server 110 receives a request submitted by the client system 102 for the most popular content entities. In response, the content ranking and search server 110 identifies and returns a set of content entities to the client system 102 via the communication network 106 for being displayed to the end user through a display of the client system 102. In some implementations, popular content entities returned by the server 110 are associated with a media content type (e.g., apps, TV shows, movies, etc.) and/or a genre (e.g., horror, sports, comedy, drama, adventure, science fiction, etc.) and displayed by a media and TV player application 140 that executes on the client system 102. In some implementations, the popular content entities associated with different content types and/or genres are displayed on distinct regions of a user interface of the media and TV player application 140, to permit user selection of recommended items (including popular items) of particular genres and/or media content types. In some implementations, an end user of a client 102 may submit a search query including one or more search keywords through a client application 103 (including in some implementations the media and TV player application 140) to the content ranking and search server 110, in response to which query a set of content entities that are most popular and relevant to the search query is identified and returned to the client system 102 by the content ranking and search server 110. A more detailed description of the media and TV player application 140 and the TV content browsing and search interface can be found in U.S. Provisional Patent Application No. 61/528,095 entitled "System and Method for Identifying Availability of Media Items," filed Aug. 26, 2011, which is incorporated by reference in its entirety.

In some implementations, the content ranking and search server 110 determines the popularity of a content entity based upon a search log database 109 that keeps track of the search activities of a large number of users through the search engine 108. For example, an end user at the client system 102 submits a search query through the Internet browser 104 to the search engine 108. The search engine 108 returns a set of search results that match the search query to the end user, each search result including a document link to a web page stored at a particular web server 105. The end user then clicks one or more of the document links to visit the web page. These user clicks are recorded in the search log database 109 such that, by processing the log entries in the database 109, the content ranking and search server 110 can determine which web pages have been visited by end users in connection with which search queries. As noted above, such information can be used for determining the popularity of a content entity by calculating the frequency of unique user visits to a predefined set of web pages that are deemed to be related to the content entity.

Note that the search engine-based approach does not include those user visits to a web page without the search engine 108 being involved. For example, an end user may enter the address of a web page directly into the address field of the Internet browser 104 and submit a request for the web page directly to a web server 105 that hosts the web page. In some implementations, such user visits can be reported to the content ranking and search server 110 by the Internet browser 104 or a component thereof. In some implementations, an analytics assistant 107 at the web server 105 reports the number of user visits to the web server 105 to the content ranking and search server 110 per an agreement between the web server 105 and the content ranking and search server 110. For example, a Javascript snippet may be inserted into the web page such that, whenever the web page is returned to a client system 102, a report about the client system 102 is submitted to the content ranking and search server 110 or another server system that the content ranking and search server 110 can access such information. In some implementations, the search engine 108, the content ranking and search server 110, or any other entity that collects an end user's web searching or browsing activities may need to get an explicit or implicit permission by the end user before using such user visit information to predict the popularity of a content entity.

As shown in FIG. 1, the content ranking and search server 110 includes a search query processing module 120 for processing the search queries submitted by the end users at the client system 102 for identifying the most relevant and popular content entities. Upon receipt of a search query including one or more search keywords, the search query processing module 120 may submit the search query to the content entities search index 130 to determine what content entities are most relevant to the search query and then identify them in the content entities database 128. Note that this process is similar to the process of the search engine 108 identifying web pages most relevant to a search query submitted by an end user at a client system 102 from an Internet browser 104. As will be described below, a content entity (e.g., a movie) is associated with one or more web pages (referred to as "reference web pages") and search queries whose textual content information and, in many instances, metadata (either or both collectively referred to as "content information") provide an accurate description of the content entity. As such, the content entities search index 130 is built upon the reference web pages and the search queries.

For a particular content entity, there are often tens of thousands of web pages or search queries that might bear some relationship to the content entity. But not every one of the web pages or search queries may qualify as a reference web page or search query for determining the content entity's popularity. In some implementations, the content ranking and search server 110 includes a web pages and search queries identification module 122 for identifying those web pages and search queries used for determining a content entity's popularity. The identified reference web pages and search queries are stored in the reference web page and search queries database 132. There are multiple ways of identifying those reference web pages or relevant search queries. In some implementations, for privacy reasons personal user information associated with identified reference web pages and search queries is not sent to the server 110 or stored in the database 132. In some implementations, for similar privacy reasons, personal user information associated with identified reference web pages and search queries is anonymized prior to being sent to the server 110 and/or stored in the database 132. As a result, only sanitized end user-related data (i.e., data that cannot be used to identify a particular person) is used by the content ranking and search server 110 for recommending any piece of content.

For example, the title of a content entity or a subset therefore often includes one or more relevant search queries. In one example, when an end user is interested in the movie "The Shawshank Redemption," he or she may submit a search query including the word "Shawshank." The search engine 108, in response, returns a list of search results based on the search keyword "Shawshank." Not surprisingly, the search result at or near top of the returned list includes a document link to a web page at the Wikipedia website, http://en.wikipedia.org/iwiki/The_Shawshank_Redemption, which provides detailed information about the movie such as title, release time, running time, director, writer, plot, producer, starring, cinematographer, editing by, music by, studio, country of release, language, budget, box office, etc. The website itself and the content of the web page both indicate that the web page is a reliable information source for the movie such that the popularity of the web page (e.g., its search ranking) is a good indicator of the associated movie's popularity. For a respective search query, the web pages and search queries identification module 122 can identify, in the search log database 109, a plurality of top web pages that users of the search engine 108 are most likely to visit by clicking through respectively document links during a predefined time period which may range from the last hour to the last week or even the last month. In other words, the click-through rate of a web page hyperlink in the search results associated with a particular set of search queries for a particular content entity indicates the popularity of the content entity if the web page is deemed to be closely related to the content entity and the web page is associated with a reliable information source. In some implementations, the user clicks are measured by embedding a Javascript routine in a search result web page that sends an HTTP request to the content ranking and search server 110 whenever a user clicks on a particular document link in the search result web page (thereby allowing the server 110 to log the resulting selected document link and associated search query).

Whether a web page should be a reference web page for a content entity depends not only on the ranking of the web page on the Internet but, more importantly, on the content of the web page itself. Therefore, an important step of selecting a reference web page is to perform textual analysis of a web page to determine whether the web page has the necessary content for providing an objective description of the content entity. In some implementations, the web pages and search queries identification module 122 performs the textual analysis of a web page to determine if the web page has a predefined content pattern. For example, a reference web page of a movie typically has a telltale pattern that includes a predefined set of text fields close to each other (e.g., title, year, director, stars, genre, box office gross revenue, etc). In some implementations, reference web pages are identified on previously designated web domains that are known to have reliable information about particular types of content entities.

In some implementations, the process of identifying reference web pages and relevant search queries may be a combination of automatic process of choosing candidate web pages based on the click-through rates and the number of hits during a predefined time period and, optionally, a manual process of reviewing the picks made by the automatic process to eliminate those false positives. In some cases, the manual process may also add some web pages that are missed by the automatic process. This complimentary process is to make sure that the reference web pages should have the acceptable levels of false positives and negatives. Depending on the type of content entities dealt with by the content ranking and search server 110, there are multiple sources for identifying the reference web pages including websites that are well-regarded as objective information providers and the websites of a professional content provider such as the TV content broadcaster or cable network official web pages including the paths, sub-domains, and micro-sites (e.g., www.example-TV-show-name.com) dedicated to a specific program. Other possible sources of the reference web pages include TV program web pages on media content aggregator sites (e.g.,www.youtube.com or the like), TV guide websites, official or unofficial web pages on social networking sites dedicated to a particular TV program, and unofficial fan web pages or discussion forums for a TV program. Note that this list is by no means exhaustive and one skilled in the art would understand that there are other specific sources of the reference web pages that are consistent with the principle disclosed herein. In some implementations, the reference web pages may further include titles of content in status updates on social networks or clicks to programs mentioned in news articles or blog entries either on a content owner's own site or network of sites or on third party websites.

Besides the reference web pages, another way of measuring the popularity of a content entity is to identify a predefined set of search queries as being relevant to a content entity and measure the number of search queries that take place for a predefined time period. For example, whenever the keyword "Shawshank" appears in a query, it is highly likely that the user is interested in the Hollywood movie that has the keyword in its title. Therefore, even if the user does not click on any particular document link, the number of times that the keyword is submitted to the search engine is still a reliable indicator of how popular the movie is. In some implementations, a relevant search query should not only have a minimum appearance requirement (e.g., at least appearing for a certain number of times for a predefined time window) but also have a minimum level of click-through rate for one or more reference web pages.

For example, the web pages and search queries identification module 122 may identify the top N most common search queries that ultimately lead to a particular reference web page for at least a predefined click-through rate.

As noted above, the ranking of a reference web page may be used for measuring the popularity of a content entity associated with the reference web page. A reference web page of a higher ranking boosts the popularity of the content entity and vice versa. In some implementations, the rankings of different reference web pages associated with the same content entity is further weighted by some other measures in their contribution to determining the content entity's popularity. For example, the ranking of a reference web page that has a highlighted "+1" viewer recommendation button may be further boosted relative to other web pages that do not have the button.

After a plurality of reference web pages and search queries are identified as being potentially related to a corpus of content entities, the web page/search query/content entity matching module 124 is responsible for matching one to another such that the popularity of a content entity can be inferred from the popularity (e.g., rankings) of the reference web pages and the volume of the search queries as being submitted by end users of the search engine 108. In some implementations, the content entities database 128 includes the metadata of a large number of content entities (e.g., the TV series, movies, and TV programs), each entity having at least one unique ID and a title. Other metadata includes start year, end year, original air date, original theatrical date of release, season, total season count, episode, total episode count per season, total episode count overall, episode title, description, rating, rating reason, version information (e.g., Director's Cut). In some implementations, a content entity can be described as having multiple children entities or a parent entity depending on the distribution channel, year, rating, etc. Each child entity is likely to have its own unique ID, metadata, and a mapping to a single parent.

The goal of matching the reference web pages or search queries to these content entities is to use the rankings of these reference web pages or search queries as a proxy or surrogate of the popularity of the content entities themselves. In some implementations, the web page/search query/content entity matching module 124 compares the metadata of a content entity with the content information (including the textual analysis result) of a reference web page or the query terms of a search query (or the resulting search results) identified by the web pages and search queries identification module 122 as described above. For example, a movie has a matching reference web page if the reference web page includes the same title and the year of release of the movie. Similarly, a TV series has a matching reference web page if the web page has the title, start and/or end years, season/episode counts, and maybe top actors (especially to differentiate similarly-titled items). In some implementations, the comparisons of metadata with the content information are imprecise and a numerical or descriptive confidence score is determined empirically and used to eliminate those matches with low confidence scores. For example, the match of title will be more important in boosting the confidence score than the match of an actor or the genre. In some implementations, the matching can be enhanced by maintaining a record of previous matches and their confidence scores. For instance if there are 10 Blade Runner movies in each database and the first 9 have already been matched with 99%+confidence then it is possible that the final Blade Runner movie is a match despite low confidence in the common metadata. These values are also determined empirically. Like the identification process, the matching process is often imprecise by nature. In this case, a manual or semi-manual quality control step is optionally used to review the quality of the matches and eliminate those false positive matches and establishes those false negative matches.

In some implementations, the reference web pages and search queries are identified by examining the log entries of related services (including the search engine 108 and the web servers 105) across a variety of time periods. For instance, the clicks on the reference web pages are broken down into separate numbers for last hour, day, week, month, and year. By doing so, the popularity data from the resulting reference web pages and search queries can accommodate both the transient and long-lasting popularity in various proportions. In some implementations, the geographical region associated with the reference web pages and search queries is also considered such that their rankings may be acceptable globally or applicable to a particular country or region.

After a set of reference web pages and/or search queries are identified for a particular content entity, the content entity ranking module 126 determines a ranking score for the content entity. In some cases, each reference web page or search query may have its own ranking scale and different rankings cannot be combined together without a re-scaling process to normalize the different ranking scales. In some implementations, the rankings of different reference web pages associated with different content entities are first normalized within each website and then aggregated together.

For example, it is assumed that a content entity A is associated with a reference web page P1 of ranking R1 and a reference web page P2 of ranking R2 and a content entity B is associated with a reference web page P3 of ranking R3 and a reference web page P4 of ranking R4. It is further assumed that P1 and P3 are associated with the website W1 and the P2 and P4 are associated with the website W2. As such, the normalized ranking of the content entity A is (R1/(R1+R3)+R2/(R2+R4)) whereas the normalized ranking of the content entity B is (R3/(R1+R3)+R4/(R2+R4)). One skilled in the art would appreciate that there are many other approaches of normalizing the rankings of different reference web pages or search queries. In some implementations, the content entities ranking module 126 assigns different weights between different reference web pages or search queries based on their respective rankings or search volumes as well as the associated temporal/spatial attributes before aggregating them together. For example, the more remote in time search queries have a lower weight than the more recent search queries. Finally, a popularity ranking is synthesized for each content entity in the content entities database 128.

Note that the popularity ranking of a content entity as described above is not directly derived from the end users' activities on the content entity but from the end users' activities on the reference web pages or search queries. But once the content ranking and search server 110 starts providing information about content entities to populate the browse and search interface client application 103 at the client system 102, the content ranking and search server 110 will be able to collect the direct response from an end user to the content entities recommended by the content ranking and search server 110 based on the rankings of their surrogates such as reference web pages and search queries. In some implementations, the information about these direct responses can be used to further refine a content entity's popularity rank as described above. For example, a relatedness score may be determined for two content entities based on their respective popularity rankings as well as their associated reference web pages or search queries. This relatedness score is used to promote/demote on content entity (e.g., changing its popularity ranking) if it turns out that the other content entity is favored or disfavored by the same end user.

Once the content ranking and search server 110 begins its operation, it is possible to obtain the actual desirability of a piece of content for a given end user. This can be done in a variety of ways, e.g., obtaining 5-star ratings, a thumbs up, a +1, or some other rating/review mechanism. In some implementations, such direct user feedback is accumulated within the content ranking and search server 110 on a per user basis. As a result, the popularity ranking of a content entity as described above may be gradually replaced or modulated by a personalized user profile that is dependent upon the user's activities through the interface such that the browse and search interface can provide more and more personalized recommendations to the end user.

In some implementations, the search queries used for determining a content entity's popularity ranking are those search queries that typically lead to a predefined number of clicks to the reference web pages. In other words, the identification of a reference web page leads to the determination of which search queries include the reference page in its search results for at least a predefined click-through rate. For example, if an average of 3 or more clicks per 10,000 searches results in a click on the reference web page result, it is presumed that the search query is relevant to the reference web page. In some implementations, a further filtering of that set of search queries can help determine a revised and presumably higher click-through rate that reflects a much smaller number of search queries that are more focused on the actual content.

In some implementations, the rankings based on the click-through rate to reference web pages can be supplemented by measuring actual visits to the reference web pages via a panel of users that agree to being monitored. In this case, the content ranking and search server 110 monitors a sizable number of end users that opt in to monitoring their Internet activities and detects all visits to the reference web pages for this subset of users. This approach, in combination with the approach described above, can provide a more accurate estimate of the popularity of a content entity.

Figure 2:
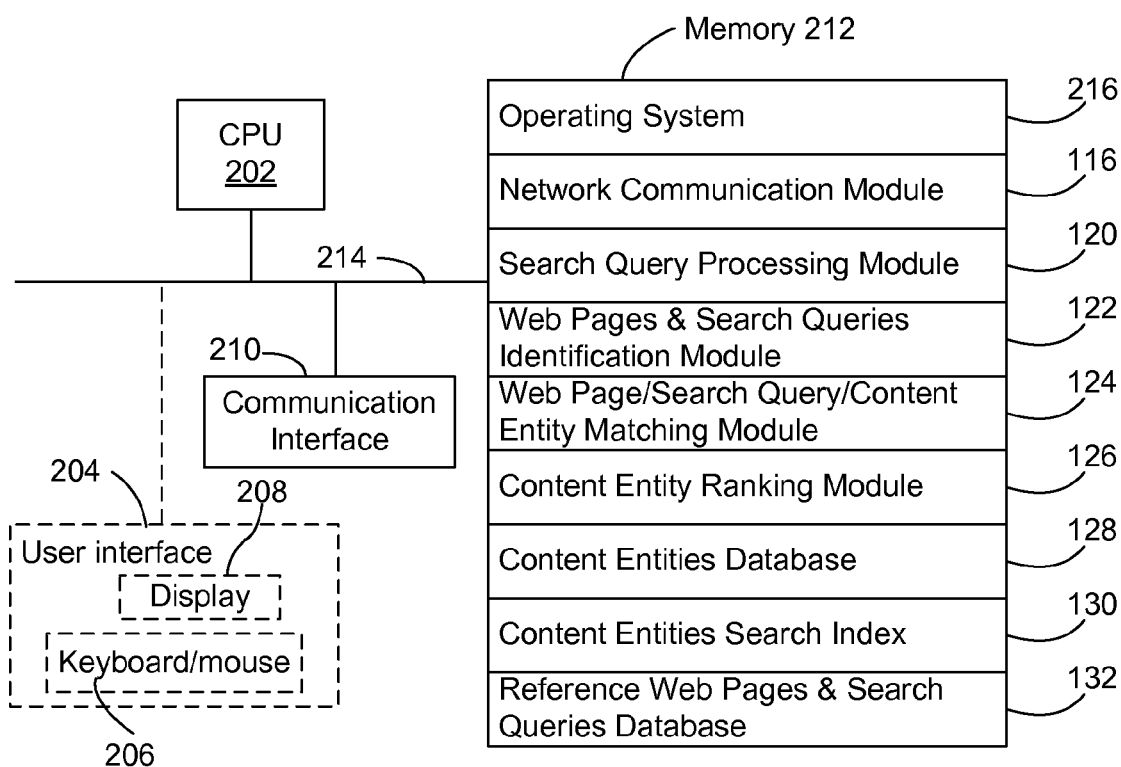
FIG. 2 is a block diagram illustrating the components of a content ranking and search server in accordance with some implementations.
Figures 3A, 3B:
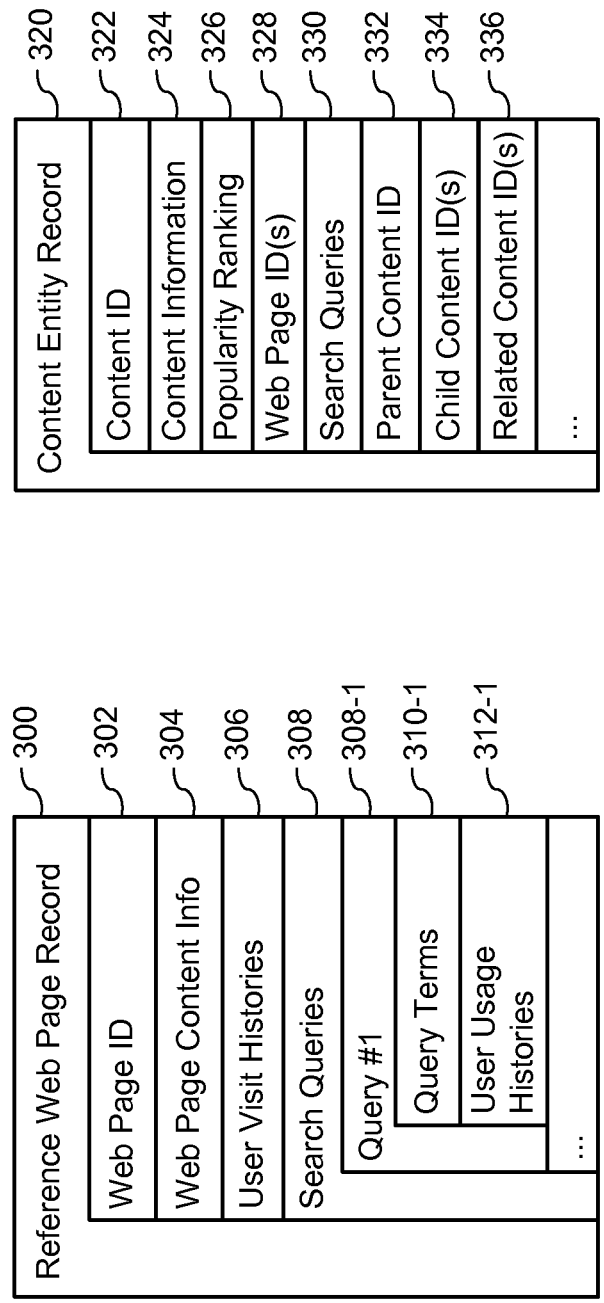
FIGS. 3A to 3B are block diagrams illustrating data structures used by the content ranking and search server in accordance with some implementations.

FIG. 2 is a block diagram illustrating the components of a content ranking and search server 110 in accordance with some implementations. The content ranking and search server 110 includes one or more processing units (CPU's) 202 for executing modules, programs and/or instructions stored in memory 212 and thereby performing processing operations; one or more network or other communications interfaces 210; memory 212; and one or more communication buses 214 for interconnecting these components. In some implementations, the content ranking and search server 110 includes a user interface 204 comprising a display device 208 and one or more input devices 206 (e.g., keyboard or mouse). In some implementations, the memory 212 includes high-speed random access memory, such as DRAM, SRAM, DDR RAM or other random access solid state memory devices. In some implementations, memory 212 includes non-volatile memory, such as one or more magnetic disk storage devices, optical disk storage devices, flash memory devices, or other non-volatile solid state storage devices. In some implementations, memory 212 includes one or more storage devices remotely located from the CPU(s) 202. Memory 212, or alternately the non-volatile memory device(s) within memory 212, comprises a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communications module 116 that is used for connecting the content ranking and search server 110 including its various components to other computers via the communication network interfaces 210 and one or more communication networks (wired or wireless), such as the Internet, other wide area networks, local area networks, metropolitan area networks, and so on;
- a search query process module 120 used for determining most popular and relevant content entities to an end user at a client system 102 based on a search query, if any, submitted by the end user;
- a web pages and search queries identification module 122 used for determining the reference web pages and search queries based on the search log database 109 and the textual analysis of web pages;
- a web page/search query/content entity matching module 124 used for matching a subset of the reference web pages and search queries to a particular content entity through content information including metadata or text comparison;
- a content entity ranking module 126 used for predicting a popularity ranking for a content entity based on the rankings of the reference web pages and search queries associated with the content entity;
- a content entity database 128 includes a plurality of content entity records, each record uniquely identifying a piece of content (see, e.g., FIG. 3B);
- a content entity search index 130 used for identifying content entity records in the content entity database 128 that match a user-provided search query; and
- a reference web page and search queries database 132 for storing the reference web pages and search queries identified as being associated with the respective content entities (see, e.g., FIG. 3A).

FIGS. 3A to 3B are block diagrams illustrating data structures used by the content ranking and search server in accordance with some implementations. In particular, the reference web page record 300 is stored in the reference web page and search queries database 132. Each record 300 includes a web page ID 302, which uniquely identifies the web page. In some implementations, the web page ID is a fingerprint of the hyperlink of the web page. The web page content information 304 includes not only the data that might be invisible on a web browser window but also the result of a textual analysis of the content of the web page. For example, if the textual analysis identifies a predefined textual pattern in the web page, the web page content information 304 may include one or more fields found in the identified textual pattern. In some implementations, the record 300 includes the user visit histories 306, which may include the user clicks of hyperlinks to the web page in a set of search results or the direct visits to the web page by the end users. As described above, the frequency of the user visits (direct or indirect) to a web page and the ranking of the web page help determine a content entity's popularity associated with the web page. In some implementations, a reference web page (especially a reference web page identified as having a predefined click-through rate) may be associated with multiple search queries 308, which lead to the clicks of a hyperlink pointing to the web page. For each search query 308-1, there are one or more query terms 310-1 and the user usage histories 312-1 (e.g., the click-through rate).

The content entity record 320 is stored in the content entities database 128. Each record 320 includes a unique content ID 322. The content information 324 includes information such as the title, year of release, cast and the like. The popularity ranking 326 of a content entity is derived from the popularity of reference web pages and search queries associated with the content entity. In some implementations, the popularity ranking 326 is modulated by the end user activities on the recommended contents through the browse and search interface so that it is more and more personalized to fit into a particular user's profile. The record 320 includes one or more web page IDs 328 that are deemed to be associated with the content entity based a comparison of the content entity's metadata with the content of the web pages associated with the web page IDs 328. The record 320 also includes one or more search queries 330 whose search volume may be an indicator of the content entity's popularity. In some implementations, the record 320 points to other content entity records through a parent content ID 332, zero or more child content IDs 334, and zero or more related content IDs 336. As described above, these content IDs are used to module a group of content entities that are related to one another.

FIGS. 4A to 4D are flow charts illustrating how the content ranking and search server 110 ranks the popularities of content entities and recommends those most popular ones to an end user in accordance with some implementations.

Figure 4A:
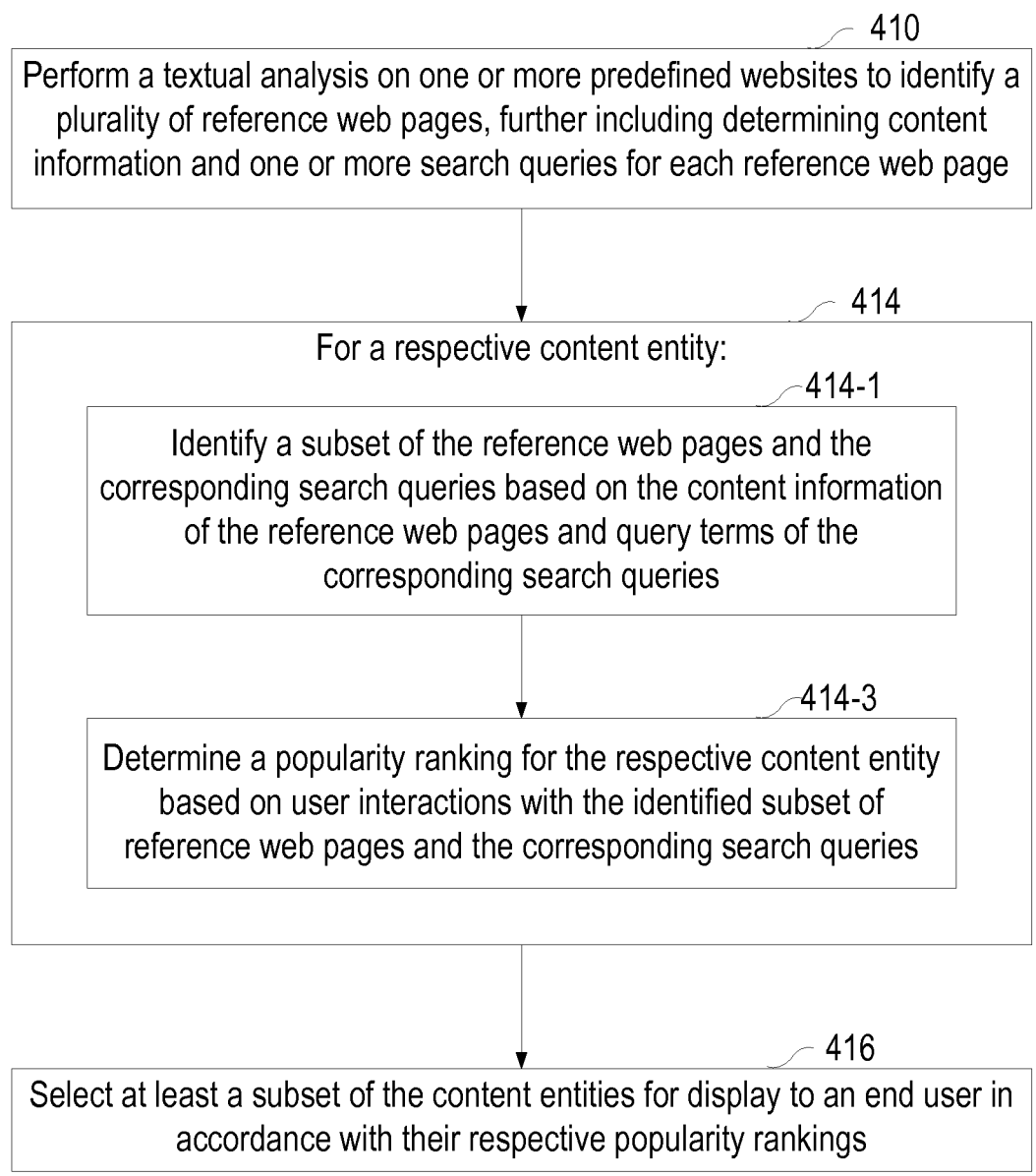
FIGS. 4A to 4D are flow charts illustrating how the content ranking and search server ranks the popularities of content entities and recommends those most popular ones to an end user in accordance with some implementations.

As shown in FIG. 4A, the content ranking and search server 110 performs a textual analysis on one or more predefined websites to identify a plurality of reference web pages (410). In some implementations, these reference web pages are identified because a predefined textual pattern is found in these web pages. In some implementations, the content ranking and search server 110 also determines content information and one or more search queries for each reference web page. The content information includes one or more text fields (e.g., title, year of release, etc.) extracted from the web page. In some implementations, the textual analysis result is subject to a manual review to eliminate those false positive picks and brings in those false negative picks. Next, the content ranking and search server 110 matches the reference web pages to one of a plurality of content entities stored in the content entities database 128. For a respective content entity (414), the content ranking and search server 110 identifies a subset of the reference web pages and the corresponding search queries based on the content information of the reference web pages and query terms of the corresponding search queries (414-1) and determines a popularity ranking for the respective content entity based on user interactions with the identified subset of reference web pages and the corresponding search queries (414-3). Finally, the content ranking and search server 110 selects at least a subset of the content entities for display to an end user in accordance with their respective popularity rankings (416).

Figure 4B:
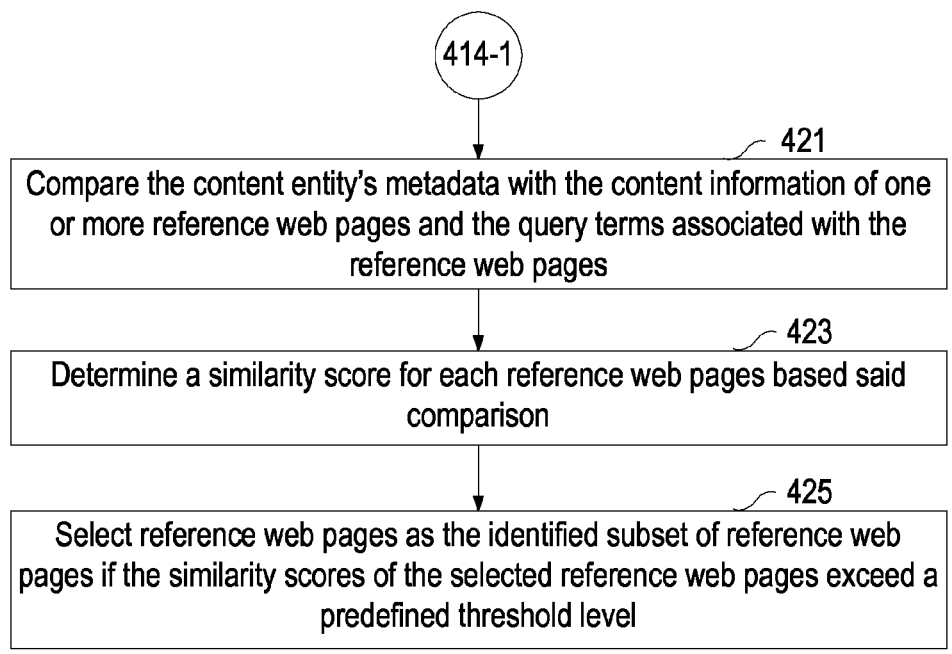

FIG. 4B further illustrates how the content ranking and search server 110 identifies a subset of the reference web pages and the corresponding search queries in accordance with some implementations. For each content entity, the content ranking and search server 110 compares the content entity's metadata with the content information of one or more reference web pages and the query terms associated with the reference web pages (421), determines a similarity score for each reference web pages based said comparison (423), and selects reference web pages as the identified subset of reference web pages if the similarity scores of the selected reference web pages exceed a predefined threshold level (425).

Figure 4C:
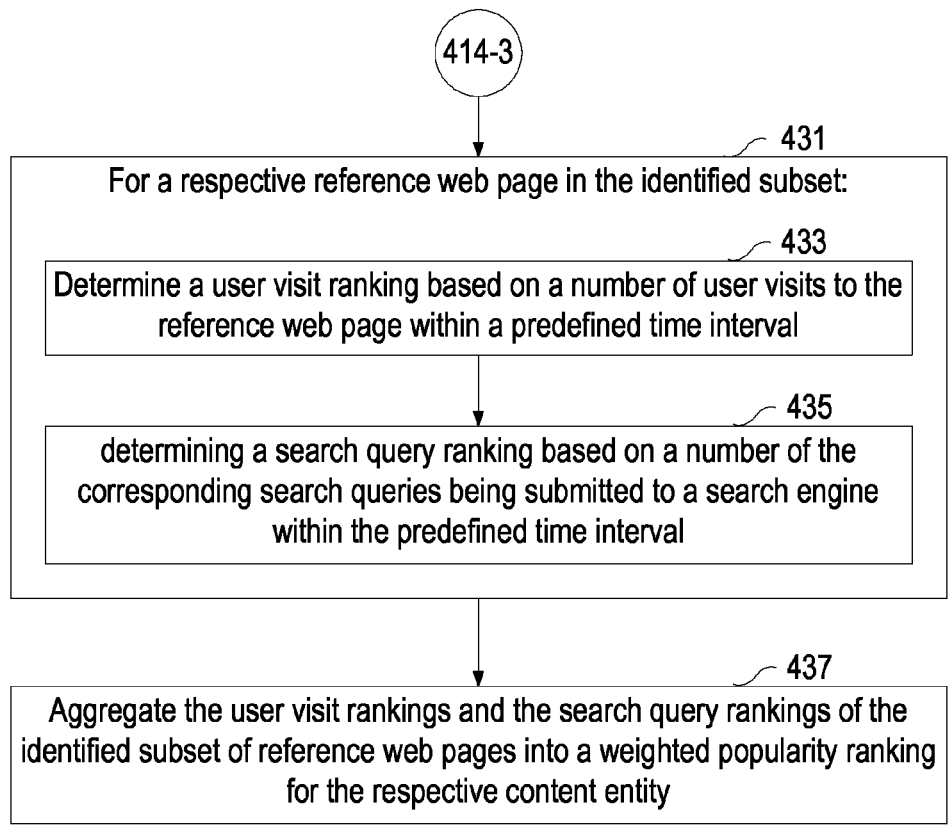

FIG. 4C further illustrates how the content ranking and search server 110 determines a popularity ranking for the respective content entity in accordance with some implementations. For a respective reference web page in the identified subset (431), the content ranking and search server 110 determines a user visit ranking based on a number of user visits to the reference web page within a predefined time interval (433) and a search query ranking based on a number of the corresponding search queries being submitted to a search engine within the predefined time interval (435), respectively. Next, the content ranking and search server 110 aggregates the user visit rankings and the search query rankings of the identified subset of reference web pages into a weighted popularity ranking for the respective content entity.

Figure 4D:
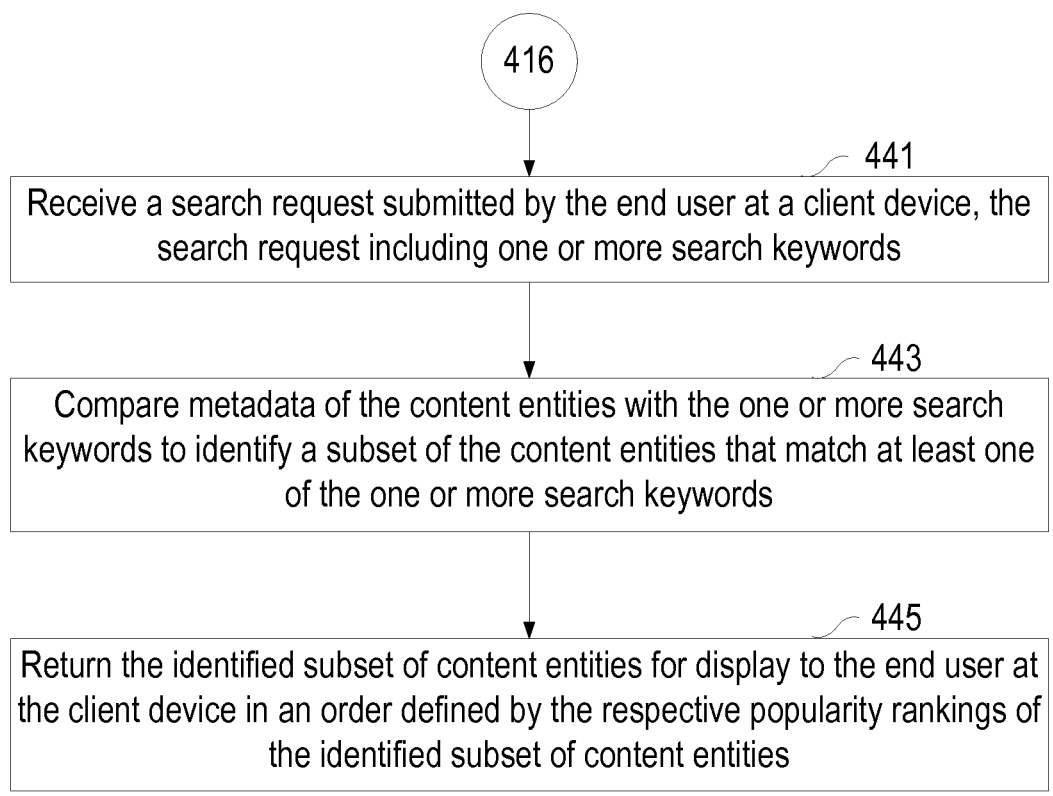

FIG. 4D further illustrates how the content ranking and search server 110 selects at least a subset of the content entities for display to an end user in accordance with some implementations. The content ranking and search server 110 receives a search request submitted by the end user at a client device (441). In some other implementations, the search request may be implicit (e.g., when the end user starts the client application 103) or explicit (e.g., when the end user enters a search request including one or more search keywords). In response to the request, the content ranking and search server 110 compares metadata of the content entities with the one or more search keywords to identify a subset of the content entities that match at least one of the one or more search keywords (443). Finally, the content ranking and search server 110 returns the identified subset of content entities for display to the end user at the client device in an order defined by the respective popularity rankings of the identified subset of content entities (445).

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. For example, the approach described herein can be used to determine the popularity of other subjects, e.g., books, resorts, electronic games, video/audio clips (e.g., artist, album, and song), celebrities and even style trends. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method for ranking content entities by their associated web pages and search queries, the method comprising:

at a computer system having memory and one or more processors:

performing an automated textual analysis on one or more predefined websites to identify a plurality of reference web pages, further including determining content information and one or more corresponding search queries for each reference web page, wherein a reference web page is a web page whose content information provides an accurate description of a particular content entity;

for a respective content entity:
identifying a subset of the reference web pages associated with the respective content entity and the corresponding search queries based on the content information of the reference web pages and query terms of the corresponding search queries; and
inferring a popularity ranking for the respective content entity based on one or more server and/or search logs of user interactions with the identified subset of reference web pages and the corresponding search queries; and in response to a user search request related to one or more content entities, selecting at least a subset of the content entities for display to an end user in accordance with their respective popularity rankings.

2. The method of claim 1, wherein the plurality of reference web pages each have a respective predefined textual pattern.

3. The method of claim 1, wherein the predefined textual pattern includes a plurality of predefined text fields within a predefined area of a web page.

4. The method of claim 1, wherein the content information of a respective reference web page includes one or more of title, release time, running time, director, writer, plot, producer, starring, cinematographer, editing by, music by, studio, country of release, language, budget, box office, and genre of a respective content entity that is a subject of the reference web page.

5. The method of claim 1, wherein a search query is determined to be associated with a respective reference web page if a click-through rate of the search query for the reference web page exceeds a predefined threshold.

6. The method of claim 1, wherein identifying a subset of the reference web pages associated with the respective content entity and the corresponding search queries further includes:
comparing the content entity's metadata with the content information of one or more reference web pages and the query terms associated with the reference web pages;
determining a similarity score for each reference web page based on said comparison; and
selecting reference web pages as the identified subset of reference web pages if the similarity scores of the selected reference web pages exceed a predefined threshold level.

7. The method of claim 1, wherein inferring a popularity ranking for the respective content entity further includes:
for a respective reference web page in the identified subset:
determining a user visit ranking based on a number of user visits to the reference web page within a predefined time interval; and
determining a search query ranking based on a number of the corresponding search queries being submitted to a search engine within the predefined time interval; and aggregating the user visit rankings and the search query rankings of the identified subset of reference web pages into a weighted popularity ranking for the respective content entity.

8. The method of claim 1, wherein selecting at least a subset of the content entities for display to an end user further includes:
receiving a search request submitted by the end user at a client device, the search request including one or more search keywords;
comparing metadata of the content entities with the one or more search keywords to identify a subset of the content entities that match at least one of the one or more search keywords; and
returning the identified subset of content entities for display to the end user at the client device in an order defined by the respective popularity ranking of the identified subset of content entities.

9. The method of claim 1, wherein a respective content entity is one selected from the group consisting of a movie, a TV program, a book, an electronic game, a resort, a celebrity profile, a video clip, an audio clip, and a style trend.

10. A computer system, comprising:
one or more processing units; and
memory storing one or more programs to be executed by the one or more processing units, the one or more programs comprising instructions for:
performing an automated textual analysis on one or more predefined websites to identify a plurality of reference web pages, further including determining content information and one or more corresponding search queries for each reference web page wherein a reference web page is a web page whose content information provides an accurate description of a particular content entity;
for a respective content entity:
identifying a subset of the reference web pages associated with the respective content entity and the corresponding search queries based on the content information of the reference web pages and query terms of the corresponding search queries; and
inferring a popularity ranking for the respective content entity based on one or more server and/or search logs of user interactions with the identified subset of reference web pages and the corresponding search queries; and
in response to a user search request related to one or more content entities, selecting at least a subset of the content entities for display to an end user in accordance with their respective popularity rankings.

11. The computer system of claim 10, wherein the plurality of reference web pages each have a respective predefined textual pattern.

12. The computer system of claim 10, wherein the predefined textual pattern includes a plurality of predefined text fields within a predefined area of a web page.

13. The computer system of claim 10, wherein the content information of a respective reference web page includes one or more of title, release time, running time, director, writer, plot, producer, starring, cinematographer, editing by, music by, studio, country of release, language, budget, box office, and genre of a respective content entity that is a subject of the reference web page.

14. The computer system of claim 10, wherein a search query is determined to be associated with a respective reference web page if a click-through rate of the search query for the reference web page exceeds a predefined threshold.

15. The computer system of claim 10, wherein identifying a subset of the reference web pages associated with the respective content entity and the corresponding search queries further includes:

comparing the content entity's metadata with the content information of one or more reference web pages and the query teens associated with the reference web pages;

determining a similarity score for each reference web page based said comparison; and selecting reference web pages as the identified subset of reference web pages if the similarity scores of the selected reference web pages exceed a predefined threshold level.

16. The computer system of claim 10, wherein inferring a popularity ranking for the respective content entity further includes:

for a respective reference web page in the identified subset:
determining a user visit ranking based on a number of user visits to the reference web page within a predefined time interval; and determining a search query ranking based on a number of the corresponding search queries being submitted to a search engine within the predefined time interval; and aggregating the user visit rankings and the search query rankings of the identified subset of reference web pages into a weighted popularity ranking for the respective content entity.

17. The computer system of claim 10, wherein selecting at least a subset of the content entities for display to an end user further includes:

receiving a search request submitted by the end user at a client device, the search request including one or more search keywords;

comparing metadata of the content entities with the one or more search keywords to identify a subset of the content entities that match at least one of the one or more search keywords; and returning the identified subset of content entities for display to the end user at the client device in an order defined by the respective popularity ranking of the identified subset of content entities.

18. The computer system of claim 10, wherein a respective content entity is one selected from the group consisting of a movie, a TV program, a book, an electronic game, a resort, a celebrity profile, a video clip, an audio clip, and a style trend.

19. A non-transitory computer readable storage medium storing one or more programs configured for execution by a computer system, the one or more programs comprising instructions for:

performing an automated textual analysis on one or more predefined websites to identify a plurality of reference web pages, further including determining content information and one or more corresponding search queries for each reference web page, wherein a reference web page is a web page whose content information provides an accurate description of a particular content entity;

for a respective content entity:
identifying a subset of the reference web pages associated with the respective content entity and the corresponding search queries based on the content information of the reference web pages and query terms of the corresponding search queries; and inferring a popularity ranking for the respective content entity based on one or more server and/or search logs of user interactions with the identified subset of reference web pages and the corresponding search queries; and in response to a user search request related to one or more content entities, selecting at least a subset of the content entities for display to an end user in accordance with their respective popularity rankings.

20. The non-transitory computer readable storage medium of claim 19, wherein the plurality of reference web pages each have a respective predefined textual pattern.

21. The non-transitory computer readable storage medium of claim 19, wherein the predefined textual pattern includes a plurality of predefined text fields within a predefined area of a web page.

22. The non-transitory computer readable storage medium of claim 19, wherein the content information of a respective reference web page includes one or more of title, release time, running time, director, writer, plot, producer, starring, cinematographer, editing by, music by, studio, country of release, language, budget, box office, and genre of a respective content entity that is a subject of the reference web page.

23. The non-transitory computer readable storage medium of claim 19, wherein a search query is determined to be associated with a respective reference web page if a click-through rate of the search query for the reference web page exceeds a predefined threshold.

24. The non-transitory computer readable storage medium of claim 19, wherein identifying a subset of the reference web pages associated with the respective content entity and the corresponding search queries further includes:

comparing the content entity's metadata with the content information of one or more reference web pages and the query terms associated with the reference web pages;

determining a similarity score for each reference web page based said comparison; and selecting reference web pages as the identified subset of reference web pages if the similarity scores of the selected reference web pages exceed a predefined threshold level.

25. The non-transitory computer readable storage medium of claim 19, wherein inferring a popularity ranking for the respective content entity further includes:

for a respective reference web page in the identified subset:
determining a user visit ranking based on a number of user visits to the reference web page within a predefined time interval; and determining a search query ranking based on a number of the corresponding search queries being submitted to a search engine within the predefined time interval; and aggregating the user visit rankings and the search query rankings of the identified subset of reference web pages into a weighted popularity ranking for the respective content entity.

26. The non-transitory computer readable storage medium of claim 19, wherein selecting at least a subset of the content entities for display to an end user further includes:

receiving a search request submitted by the end user at a client device, the search request including one or more search keywords;

comparing metadata of the content entities with the one or more search keywords to identify a subset of the content entities that match at least one of the one or more search keywords; and returning the identified subset of content entities for display to the end user at the client device in an order defined by the respective popularity rankings of the identified subset of content entities.

27. The non-transitory computer readable storage medium of claim 19, wherein a respective content entity is one selected from the group consisting of a movie, a TV program, a book, an electronic game, a resort, a celebrity profile, a video clip, an audio clip, and a style trend.

* * * * *

UNITED STATES PATENT AND TRADEMARK OFFICE
CERTIFICATE OF CORRECTION

| | | |
|---|---|---|
| PATENT NO. | : 9,098,551 B1 | Page 1 of 1 |
| APPLICATION NO. | : 13/662235 | |
| DATED | : August 4, 2015 | |
| INVENTOR(S) | : Fryz et al. | |

It is certified that error appears in the above-identified patent and that said Letters Patent is hereby corrected as shown below:

In the claims,

Claim 24, col. 16, line 28, please delete "based said" and insert --based on said--.

Signed and Sealed this
Twenty-second Day of December, 2015

Michelle K. Lee
*Director of the United States Patent and Trademark Office*